UNITED STATES PATENT OFFICE.

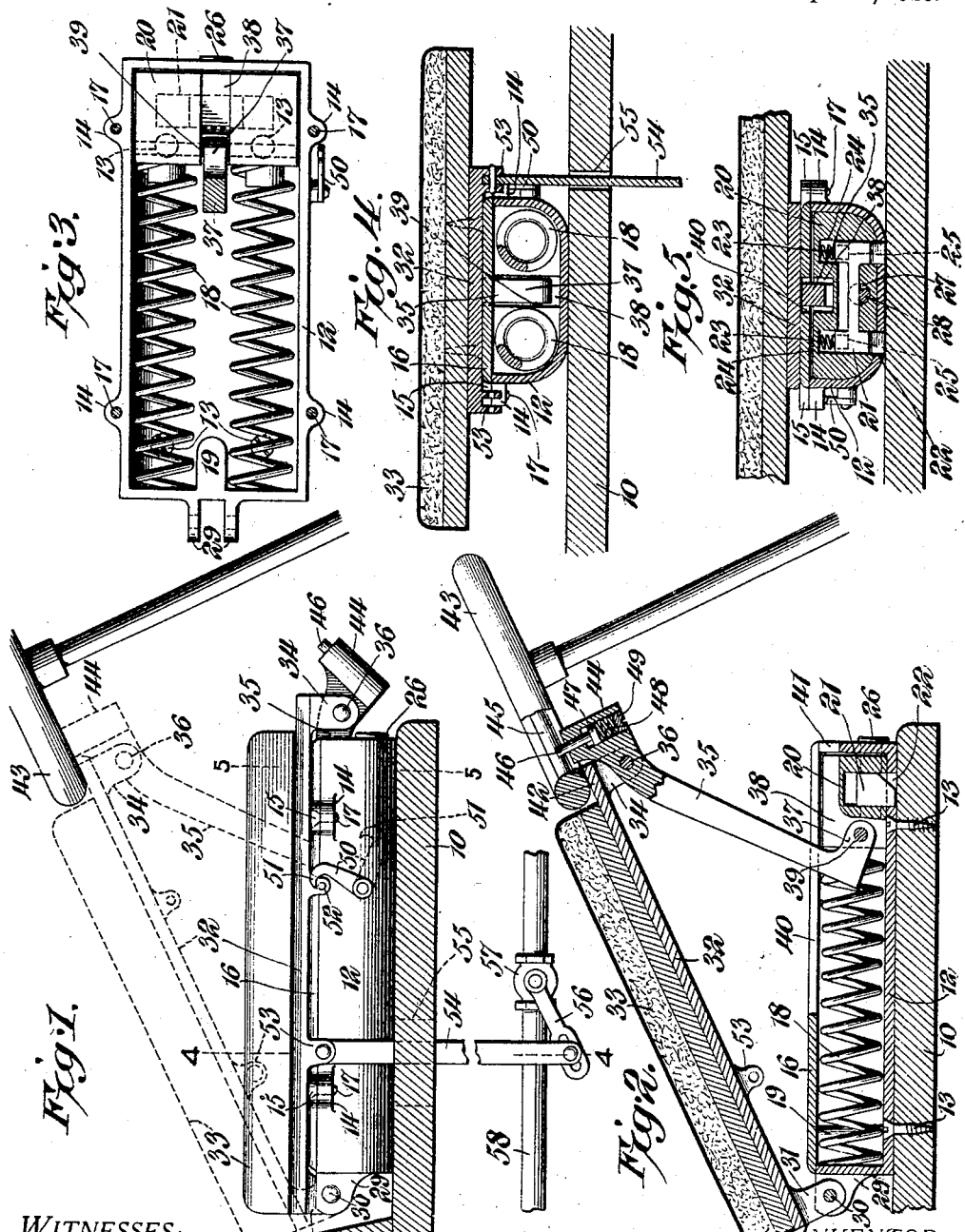

CHRISTIAN ALFRED PETERSEN, OF BEVERLY, MASSACHUSETTS.

AUTOMOBILE-LOCK.

1,198,572.   Specification of Letters Patent.   Patented Sept. 19, 1916.

Application filed November 16, 1915. Serial No. 61,828.

*To all whom it may concern:*

Be it known that I, CHRISTIAN A. PETERSEN, a citizen of the United States, residing at Beverly in the county of Essex and State of Massachusetts, have invented a new and useful Automobile-Lock, of which the following is a specification.

The present invention relates to an improved lock for automobiles, or the like, and has for an object to provide means for securing the operative parts of the vehicle in such position that the vehicle cannot be started, and to so lock the driver's seat that it cannot be occupied, unless released by the authorized person.

The invention aims at the provision of a seat, which, as soon as the driver dismounts from the vehicle, will automatically move into a position, and lock itself in such position wherein the seat cannot be occupied, unless it is unlocked or released by the proper authority, and which, when so locked, will hold the operative parts of the machine securely from movement; such as the steering mechanism, and the gasolene supply valve.

A further object of the invention is to provide a seat which is hinged, and which is adapted to be swung up into engagement against the steering wheel, and having fingers for engagement between the spokes of the steering wheel to prevent the turning of the latter, the fingers being yieldable to engage the under side of the spokes, should the same register with the fingers upon the raising of the seat, and to automatically project the fingers up between the spokes, should attempt be made to turn the steering wheel.

A still further object of the invention is to provide a device with a latching attachment whereby when the seat is unlocked, the same may be held in partially depressed position, so that the parts of the machine may be operated to shift the machine, or to test the parts of the same, such as in repairing, the latching attachment being automatically releasable upon the depression of the seat into operative position to admit of the automatic movement of the seat into locked position, should the driver afterward leave the vehicle.

Other objects and advantages of this invention will be fully brought out in the following description of the present preferred embodiment of this invention, the same being illustrated in the accompanying drawing, wherein:

Figure 1 is a side elevation of the improved seat, and its attachments, in the position which it assumes when occupied, the dotted lines showing the position of the seat after the driver has left the same. Fig. 2 is a longitudinal sectional view, taken through the seat and its parts, the same being adjusted into locked position. Fig. 3 is a top plan view of the seat supporting casing, showing the parts therein in locked position. Fig. 4 is a transverse section through the seat and its casing, taken on the line 4—4 of Fig. 1, and showing the parts in position when the driver is seated. Fig. 5 is a transverse section, taken through the device in the position shown in Fig. 1, on the line 5—5 of Fig. 1.

Referring to this drawing, wherein like parts are designated by similar numerals of reference throughout the several views, 10 designates the base board of a seat construction usually formed in the body of a motor vehicle, and provided at its rear edge with an upwardly extending back 11, having the desired cushions or upholstering to provide for a comfortable support for the back of the driver. This base board 10 is provided upon its upper face with a casing 12 of any desired form, but which is shown in the present instance as being substantially rectangular and elongated, extending lengthwise from front to rear across the base 10. The casing 12 is secured to the base 10 by any suitable means, such as by screws 13, countersunk into the base 10. The casing 12 has, at its opposite sides and at its upper edges, outstanding ears 14, which receive and support laterally extending lugs 15, carried upon a cover 16, closing the top of the casing 12. The cover 16 is held in place by screws 17, or the like, passing through the lugs 15, and into the ears 14.

Longitudinally arranged in each side of the casing 12, is an expanding coil spring 18, the springs being separated at their inner ends by an intermediate web 19 projecting forwardly from the rear wall of the casing 12 between the springs, as shown to advantage in Fig. 3, this web 19 providing, between the same and the sides of the casing 12, seats for the springs, to hold the same from lateral displacement, when placed under compression. As will be noted from Fig. 4, the sides and bottom of the casing 12 are joined by rounded corners or faces, which conform substantially to the curvature of the springs 18. In the forward end of the casing 12 is mounted a traveler 20. This traveler 20 comprises a block extending across the inside of the casing, and adapted for longitudinal movement of the casing at its forward end, the springs 18 bearing against the rear side of the traveler 20, to normally urge the same into the forward end of the casing. The traveler 20 is provided with a latch 21. The latch is substantially U-shape, as shown in Fig. 5, and has the legs thereof projecting downwardly through the traveler 20 for engagement in keeper slots 22, formed in transverse alinement within the bottom of the casing 12. Above the opposite ends of the latch 21 are springs 23 retained in recesses 24 formed in the traveler 20 and seated at their lower ends in pockets 25 formed in the upper faces of the ends of the latch 21. It will be noted that the portions of the latch 21 in which the seats 25 are formed, extend upwardly into the recesses 24 to a sufficient distance to hold the latch 21 in vertical alinement at all times, and prevent any lateral twisting of the latch incident to pressure upon the traveler 20, to move the same backwardly within the casing. The front wall of the casing 12 is provided with an escutcheon plate 26 in registry with a key slot or opening 27 formed in the front of the traveler 20, the slot or opening 27, as may be best seen from Fig. 5, lying partly below the lower surface of the intermediate portion of the latch 21, so that when the barrel 28 of a key is projected through the escutcheon plate 26 and into the opening 27, the barrel will engage beneath the latch 21, and lift the same sufficiently to clear the keeper slots 22.

Projecting rearwardly from the casing 12 is a pair of spaced apart bracket ears 29, between which is hinged, upon a pin 30, a depending lug 31. The lug 31 is carried upon the rear end of a seat plate 32, adapted to swing down upon the top of the casing 12 and support a cushion 33, which forms the seat proper of the vehicle. The forward end of the seat plate is provided with a pair of depending spaced apart ears 34 between which is hinged the upper end of a supporting arm 35, the latter being hinged upon a pin 36 passing transversely through the ears 34 and through the arm 35. The lower or inner end of the arm 35 is provided with an angle projection 37, which extends into an angular slot 38 formed in the rear and top faces of the traveler 20, as shown to advantage in Figs. 2 and 3. The projection 37 is mounted upon a pin 39 extending transversely through the traveler 20, to hold the projection in such position, that when the traveler 20 is retracted, the intermediate portion of the arm 35 will lie horizontally within the recess 38 across the upper face of the traveler. It will be noted that the top 16 of the casing is provided with a longitudinal slot 40, through which the arm 35 projects, the slot being of sufficient length to admit the free movement of the arm during the travel of the follower in the casing. The front wall of the casing is likewise provided with a slot 41 in its upper edge registering with the slot 40, and adapted to receive the lower edge of the outer end of the arm 35.

When the traveler 20 is in its outermost position, as shown in Figs. 2 and 3, the seat 33 is swung up at an angle, as shown in Fig. 2, and the seat plate 32 projects slightly beyond the forward edge of the cushion 22 to provide a stop or rest 42, for engagement beneath the steering wheel 43 of the vehicle. The outer extremity of the arm 35 beyond the pivot pin 36 is transversely enlarged to provide a cylindrical housing 44, the upper end of which terminates immediately below the plane of the spokes 45 of the steering wheel. The housing 44, which may be of any desired width or size, is provided with one or more locking pins 46 projecting through the upper end of the housing 44, each pin having a head 47 upon its inner end slidable vertically in a counterbore formed in the housing 44. An expansion spring 48 in the housing 44 bears against the head 47 and is adjusted, as to its tension, against the head, by a screw cap 49, mounted in the lower end of the housing 44. The pins or fingers 46 are adapted to project upwardly beyond the housing 44, and into the path of the spokes 45 of the steering wheel when the latter is rotated to limit the rotation thereof, and consequently prevent the operation of the steering gear.

At one side of the casing, a hook 50 is pivoted, the same having a preferably rearwardly and upwardly extending bill 51, adapted to engage over a laterally extending pin 52 carried upon the seat plate 32. It will be noted, from Fig. 1 particularly, that the pin 52 is offset forwardly from the vertical plane of the pivot of the hook 50, so that when the hook 50 is in engagement with the pin 52, the hook inclines forwardly, and the hook 50 is of such a length that it binds against the pin 52 only when the seat is raised slightly to tension the pin in the bill of the hook. Thus, when the seat is depressed, as shown in full lines in Fig. 1, the pin 52 is moved below the bill 51 of the hook, and the latter, by reason of its forwardly inclined position, drops by gravity into the position shown in dotted lines in Fig. 1, out of the path of the pin 52. The purpose of this arrangement and action, is that when the driver is seated, the hook 50 is automatically released from the pin 52, and moved out of the way, so that when the driver again dismounts from the vehicle, the seat will automatically rise and lock, and not be hindered by the hook 50. Thus, the device does not depend upon the memory of the operator to release the hook, but the device is automatically released, so that it will automatically assume the locked position, when the driver leaves the vehicle.

It is also a purpose of this invention to utilize this movement of the seat, and the locking of the same in such position that it cannot be used, for the purpose of controlling the adjustment or use of other controlling elements on the vehicle. For instance, in the drawing, the plate 32 is shown, as having pairs of apertured lugs 53 at its opposite sides adapted to have connection with any suitable devices to be controlled. In Figs. 1 and 4, one pair of lugs 53 is shown, as having pivotal connection with a bar 54 passing downwardly through an opening 55 in the base 10, and being pivoted at its lower end to an arm 56 of a controlling valve 57, located in the gasolene line or pipe 58. Thus, when the seat is raised and locked into the position shown in dotted lines in Fig. 1, the bar 54 is drawn up, and the valve 57 actuated to cut off the flow of gasolene, and thus prevent the running of the motor to drive the vehicle. It is, of course, understood that the seat may be connected to any other controlling element, as above noted, and the invention is not limited to the cutting off of the gasolene supply.

In operation, the device is normally raised and located, as shown in dotted lines in Fig. 1, and in the section in Fig. 2. When it is desired to operate the machine, the driver inserts the key 28 in the escutcheon plate 26 and opening 27, and turns the key to raise the latch 21 to clear the keeper openings 22. As soon as the latch 21 is raised, the seat may be forced down and occupied so as to hold the seat down against the tension of the relatively heavy springs 18. When the seat is forced down, the arm 35 is swung inwardly against the bottom of the seat plate 32, and the traveler 20 is forced backwardly within the casing, the sides, bottom, and top thereof serving as a guide for the traveler, to compress the springs 18. This rearward swinging of the arm 35 draws the housing 44 on the outer end thereof down out of engagement with the steering wheel 43. The action removes the pins or fingers 46 from the path of the spokes 45, and thus admits of the free operation of the steering wheel. At the same time, the lugs 53 are moved down with the seat plate 32, so that the bar 54 is forced downwardly through the opening 55 in the base 10, and caused to open the valve 57 to admit the free flow of the controlling fluid through the supply pipe 58. Should it be desired to retain the seat down, and at the same time admit of the operator leaving the seat, the hook 50 is raised up into the path of the pin 52, and the seat allowed to spring up through a short distance. This slight movement of the seat engages the pin 52 within the bill 51 of the hook, and tensions the pin in the hook, so that the hook is held by the frictional contact of the pin therewith, as well as by reason of the slight curvature of the bill 51. As above explained, the hook 50 is automatically released when the operator occupies the seat, as the seat is moved down, the pin 52 is removed from the hook 50, and the latter is permitted to swing, by gravity, out of the path of the pin 52. As soon as the operator rises from the seat, the latter springs upwardly by the forward movement of the traveler 20, and the lifting of the arm 35, the hook 50 being out of the way, so that the locking operation is automatic. It will be noted that these yieldable pins 46 are employed in the outer extremity of the lever 35. The pins are made yieldable for the reason that should the steering wheel be stopped in a position to locate one of the spokes 45 immediately above the pin, the locking of the seat would not be hindered, as the pins 46 would bear against the lower side of the spokes 45, and would be in position to spring up between the spokes upon the slight movement of the steering wheel, and thus prevent the return of the steering wheel to its initial position, or prevent any appreciable further turning of the same.

Although one form of this invention has been specifically set forth, as above, it is to be understood that it is within the spirit of this invention to make changes and modification in the relative arrangement and formation of the various parts, which are shown in the accompanying drawing and above described, and that these changes or modifications are restricted only by the following claims, and are for the purposes of adapting the present invention to vehicles of different types, and to conditions found in the manufacture of the improved automobile lock.

What is claimed is:—

1. In a motor vehicle, the combination with a steering wheel, and a seat, of means for locking said seat to the steering wheel to prevent operation thereof, and prevent use of the seat.

2. In a motor vehicle, the combination with a steering wheel and a seat located in rear thereof, means for mounting the seat so that it may swing upwardly from the front toward and in engagement with the steering wheel in an inclined position substantially in line with the top of the steering wheel, and means for locking the wheel and seat in such relation.

3. In combination with a steering wheel, and a movable seat, means for raising the seat automatically upon its being vacated by the chauffeur, and locking means provided on the seat to engage the steering wheel when the seat is raised, whereby operation of the steering wheel is prevented.

4. In a motor vehicle, the combination with a steering wheel, and a seat, of means for automatically swinging the seat into position to prevent use thereof, means for simultaneously locking the steering wheel to the seat to prevent the turning of the steering wheel, and means for automatically locking the seat in its inoperative position.

5. In a motor vehicle, the combination with a steering wheel, and a seat, of means for automatically raising the seat into engagement with the steering wheel to prevent use of the seat, and prevent operation of the steering wheel, and means for locking the seat in such inoperative position.

6. In a motor vehicle, the combination with a steering wheel, and a seat located in rear thereof, means for hinging the seat at the rear so that it may swing upwardly in an inclined position with its front end substantially in line with the top of the said wheel, means for raising the seat automatically to such position upon its being vacated by the chauffeur, and means for locking the seat in its raised position.

7. In combination with a seat, means for hinging the same, means for automatically raising the seat to an inoperative position upon its being vacated by the occupant, means for locking the seat in such position, and a holding device adapted to hold the seat down in normal position in opposition to said raising means, said holding device being automatically released by the weight of the occupant upon the seat.

8. In combination with a casing, a seat hinged at one end thereto, an arm pivoted upon the seat at the free end of the latter, spring-actuated means within the casing for moving said arm to raise the seat above the casing, and means for locking said raising means to retain the seat in its raised position.

9. In a motor vehicle, the combination with a steering wheel, and a seat, of means for automatically raising the seat into engagement with the steering wheel, means for locking the seat in such position, and a holding device adapted to retain the seat in operative position when not in use, and being automatically releasable by the use of the seat.

10. In a motor vehicle, the combination with a steering wheel, and a seat, of a hinge for supporting the seat, an arm pivoted to the seat in spaced relation to the hinge, means for normally swinging the arm down beneath the seat to raise the latter against the steering wheel, engaging means carried upon the outer end of the arm, and projecting forwardly from the seat to project up into the steering wheel, when the arm is swung down, and means for locking said arm when swung down, to hold the seat and the steering wheel from movement.

11. In a motor vehicle, the combination with a steering wheel, and a pivoted seat, of an arm pivoted upon the seat, springs engaging the arm to force the latter downwardly from beneath the seat to elevate the latter against the steering wheel, a retaining finger carried upon the outer end of the arm adapted to be swung up into engagement with the spokes of the steering wheel upon the downward movement of the arm, and means for locking the arm from movement when swung down.

12. In a motor vehicle, the combination with a steering wheel, and a seat, of a casing beneath the seat for pivotally supporting the same, a traveler movable longitudinally in the casing, springs in the casing normally urging the traveler forwardly, an arm pivoted to the traveler at one end, and pivoted to the seat at its opposite end, whereby to raise the seat upon the forward movement of the traveler, and locking means between the traveler and the casing to secure the traveler in the forward end of the casing, and hold the seat in elevated position.

13. In a motor vehicle, the combination with a seat base, and a steering wheel, of a casing mounted on the seat base, a seat pivoted to the rear end of the casing and adapted for engagement at its forward end with the steering wheel, a traveler in the casing, an arm hinged at its opposite ends to said traveler and to the forward end of the seat, tension means in the casing engaging the traveler to normally urge the same forwardly and lift the seat, a latch mounted in the traveler for engagement with the casing when the traveler is in the forward end thereof to lock the traveler from backward movement, and yielding pins carried at the outer end of the seat for engagement between the spokes of the steering wheel.

14. In a motor vehicle, the combination with a seat, and a steering wheel, of a casing beneath the seat to which the latter is hingedly connected, elevating means within the casing engaging the seat to raise the same into engagement with the steering wheel, a yieldable pin extending upwardly from the forward end of the seat for engagement between the spokes of the steering wheel, said pin being adapted to yield for engagement with a spoke when the latter registers immediately above the pin, and adapted to project upwardly between the spokes of the wheel upon the slight rotation of the same.

15. In a motor vehicle, the combination with a steering wheel, and a seat, of a casing secured beneath the seat, and being hinged thereto at the rear end of the seat, a traveler in the casing, an arm between the traveler and the seat, a pair of springs in the casing bearing against the traveler to urge the same forwardly to raise the seat, a latch in the traveler for engagement with the casing at its forward end, means for releasing the latch from the casing to admit of the backward movement of the traveler, and locking fingers carried upon the forward end of the seat, having connection with said traveler, to engage the fingers with the spokes of the steering wheel, when the traveler is in its forward position.

16. In a motor vehicle, the combination with a steering wheel, a seat, and the operative parts of the vehicle, a hinged seat plate beneath the seat, an elevating arm pivoted to the seat plate, and adapted for movement therebeneath to raise and lower the seat, locking fingers carried by the seat plate for engagement with the spokes of the steering wheel when the seat plate is raised, and pivot lugs carried by the seat plate for engagement with said operative parts of the vehicle to hold the same from operation upon the locking of the steering wheel.

17. In a motor vehicle, the combination with a steering wheel, a seat base, and the operative parts of the vehicle, of a casing fixed upon the seat base, and having rearwardly extending ears, a seat plate having a depending lug fitting between said ears, and having pivotal engagement therewith, a traveler in the casing, springs in the opposite sides of the casing engaging the traveler to urge the same forwardly, a web in the rear end of the casing dividing the same to provide spring seats for said springs in the sides of the casing, an arm pivoted at its outer end to the traveler, and at its inner end to the outer end of the seat plate, a movable pin in the inner end of said arm, a spring in said arm engaging the pin to normally urge the same outwardly between the spokes of the steering wheel, means for locking the traveler in its forward position to hold the seat raised, and to retain the fingers between the spokes of the steering wheel, and pivot lugs carried by the seat plate for connection with the operative parts of the vehicle to hold the same from operation, when the steering wheel and the seat are interlocked.

In testimony, that I claim the foregoing as my own, I have hereto affixed my signature in the presence of two witnesses.

CHRISTIAN ALFRED PETERSEN.

Witnesses:
 JENS APPEL HANSEN,
 LAURITS AXEL PETERSEN.